United States Patent [19]

Schwendeman

[11] Patent Number: 5,710,766
[45] Date of Patent: Jan. 20, 1998

[54] METHOD AND APPARATUS FOR SHARING A COMMON BANDWIDTH BETWEEN TWO PROTOCOLS IN A RADIO COMMUNICATION SYSTEM

[75] Inventor: Robert John Schwendeman, Pompano Beach, Fla.

[73] Assignee: Motorola, Inc., Schaumburg, Ill.

[21] Appl. No.: 578,792

[22] Filed: Dec. 26, 1995

[51] Int. Cl.⁶ ............................................. H04Q 7/20
[52] U.S. Cl. ........................... 370/329; 370/468; 370/471
[58] Field of Search .......................... 370/328, 329, 370/336, 345, 465, 468, 470, 471

[56] References Cited

U.S. PATENT DOCUMENTS

| | | | |
|---|---|---|---|
| 4,519,068 | 5/1985 | Krebs et al | 370/471 |
| 5,323,396 | 6/1994 | Lokhoff | 370/471 |
| 5,629,940 | 5/1997 | Gaskill | 370/471 |

Primary Examiner—Melvin Marcelo
Attorney, Agent, or Firm—R. Louis Breeden

[57] ABSTRACT

In a radio communication system a method and apparatus enables sharing a bandwidth between two protocols that can support different maximum numbers of subchannels (510–516, 602–614) in the bandwidth. The protocols utilize transmission frames (402) having frame durations (716) that are integer multiples of one another. A fixed portion (102) of the system synchronizes (1002) the frames of the two protocols and determines (1004) a sharing plan for the subchannels utilized by each protocol. The sharing plan applies to a subsequent group of frames. The fixed portion vectors (1008) a portable receiver (122, 123) that has a message to be received in accordance with the sharing plan prior to transmission of the subsequent group of frames. Both the fixed portion and the portable receiver share (1010) the bandwidth between the two protocols in accordance with the sharing plan during transmission of the subsequent group of frames.

21 Claims, 7 Drawing Sheets

1000

5,710,766

METHOD AND APPARATUS FOR SHARING A COMMON BANDWIDTH BETWEEN TWO PROTOCOLS IN A RADIO COMMUNICATION SYSTEM

RELATED APPLICATION

Application Ser. No. 08/236,841 filed May 2, 1994 by Schwendeman, entitled "Multiple Subchannel Flexible Protocol Method and Apparatus."

FIELD OF THE INVENTION

This invention relates in general to radio communication systems, and more specifically to a method and apparatus for sharing a common bandwidth between two protocols used in a radio communication system.

BACKGROUND OF THE INVENTION

Protocols that support multiple subchannels within a bandwidth assigned to a radio communication system are well known. One such protocol is Motorola's FLEX™ family of protocols. These protocols are able to use at least a portion of one or more subchannels as a control subchannel, and a remainder of the subchannels for carrying messages.

As new and more powerful protocols are developed, it is expected that they will be capable of supporting more subchannels in a given bandwidth than today's protocols. More subchannels in a given bandwidth are advantageous for carrying more communication traffic. It will become desirable, therefore, to convert from an old protocol supporting fewer subchannels to a new and more powerful protocol when available.

Conversion creates a problem, however, because communication system operators will not want to immediately discard their investment in communication devices that operate with the old protocol. Instead, the operators will want to serve devices that operate with either protocol on a shared basis on the bandwidth assigned to the radio communication system. In the past, sharing two protocols on the same system generally has meant time-multiplexing the protocols. Time-multiplexing unfortunately causes latency problems, because messages utilizing one protocol are delayed during times in which the other protocol is operating.

Thus, what is needed is a method and apparatus for sharing a common bandwidth between two protocols used in a radio communication system. The method and apparatus preferably should minimize latency and provide for flexible and efficient sharing of the common bandwidth between the two protocols as the conversion occurs.

SUMMARY OF THE INVENTION

An aspect of the present invention is a method in a radio communication system including a fixed portion and a portable portion. The method is for sharing a common bandwidth between first and second protocols that can support up to N subchannels and M subchannels, respectively, within the common bandwidth, N and M being predetermined positive integer values. The first and second protocols utilize transmission frames having first and second frame durations that are integer multiples of one another. The method comprises in the fixed portion the steps of synchronizing the transmission frames of the first protocol with those of the second protocol, and determining a sharing plan for the subchannels utilized by the first and second protocols within the common bandwidth, the sharing plan applicable to a subsequent group of simultaneous transmission frames comprising messages. The method further comprises in the fixed portion the step of vectoring a receiver of the portable portion that has a message to be received in one of the first and second protocols. The vectoring is done in accordance with the sharing plan and prior to a transmission of the subsequent group of simultaneous transmission frames. The method comprises in both the fixed portion and the portable portion the step of sharing the common bandwidth between the first and second protocols in accordance with the sharing plan during the transmission of the subsequent group of simultaneous transmission frames.

Another aspect of the present invention is a radio communication system for sharing a common bandwidth between first and second protocols that can support up to N subchannels and M subchannels, respectively, within the common bandwidth, N and M being predetermined positive integer values. The first and second protocols utilize transmission frames having first and second frame durations that are integer multiples of one another. The radio communication system includes a fixed portion, comprising a controller. The controller includes a processing system for controlling the radio communication system, an input interface coupled to the processing system for receiving messages intended for a portable portion, and a transmitter interface coupled to the processing system for controlling a plurality of transmitters to send the messages to the portable portion. The processing system is programmed for synchronizing the transmission frames of the first protocol with those of the second protocol, and is further programmed for determining a sharing plan for the subchannels utilized by the first and second protocols within the common bandwidth. The sharing plan is applicable to a subsequent group of simultaneous transmission frames. The processing system is further programmed for vectoring a receiver of the portable portion that has a message to be received in one of the first and second protocols. The vectoring is done in accordance with the sharing plan and prior to a transmission of said subsequent group of simultaneous transmission frames. The fixed portion further comprises a plurality of transmitters coupled to the transmitter interface for sending an address, a vector, and the message to the receiver. The radio communication system further includes the portable portion, comprising first receivers coupled to the fixed portion by a radio signal operating on the first protocol, and second receivers coupled to the fixed portion by a radio signal operating on the second protocol. The fixed portion and the portable portion share the common bandwidth between the first and second protocols in accordance with the sharing plan during the transmission of the subsequent group of simultaneous transmission frames.

Another aspect of the present invention is a controller in a radio communication system for sharing a common bandwidth between first and second protocols that can support up to N subchannels and M subchannels, respectively, within the common bandwidth, N and M being predetermined positive integer values. The first and second protocols utilize transmission frames having first and second frame durations that are integer multiples of one another. The controller comprises a processing system for controlling the radio communication system, an input interface coupled to the processing system for receiving messages intended for a portable portion, and a transmitter interface coupled to the processing system for controlling a plurality of transmitters to send the messages to the portable portion. The processing system is programmed for synchronizing the transmission frames of the first protocol with those of the second protocol and is further programmed for determining a sharing plan for the subchannels utilized by the first and second protocols within the common bandwidth, the sharing plan applicable to a subsequent group of simultaneous transmission frames. The processing system is further programmed for vectoring a receiver of the portable portion that has a message to be received in one of the first and second protocols. The vectoring is done in accordance with the sharing plan and prior to a transmission of said subsequent group of simultaneous transmission frames. The controller controls the radio communication system to share the common bandwidth between the first and second protocols in accordance with the sharing plan during the transmission of the subsequent group of simultaneous transmission frames.

DESCRIPTION OF THE PREFERRED EMBODIMENT

Figure 1:
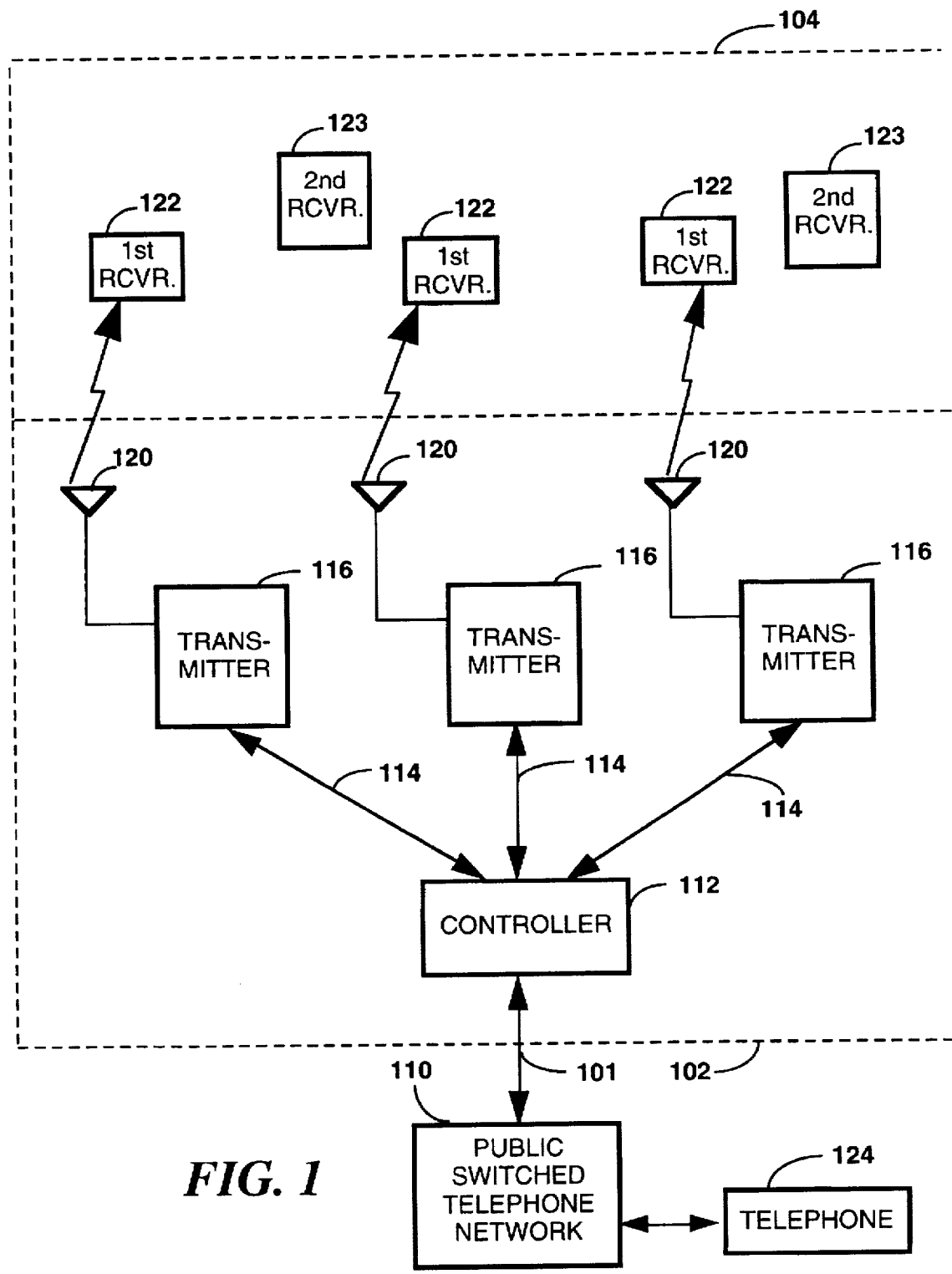
FIG. 1 is an electrical block diagram of a radio communication system in accordance with the preferred embodiment of the present invention.

Referring to FIG. 1, an electrical block diagram of a radio communication system 102, 104 in accordance with the preferred embodiment of the present invention comprises a fixed portion 102 and a portable portion 104. The fixed portion 102 includes a plurality of transmitters 116, for communicating with the portable portion 104, utilizing conventional transmission techniques, and coupled by communication links 114 to a controller 112 which controls the transmitters 116. The hardware of the controller 112 is preferably a combination of the Wireless Messaging Gateway (WMG™) Administrator!™ paging terminal and the RF-Conductor!™ message distributor manufactured by Motorola, Inc. The hardware of the transmitters 116 is preferably a Nucleus Orchestra!™ transmitter manufactured by Motorola, Inc. It will be appreciated that other similar hardware can be utilized for the controller 112 and transmitters 116.

Each of the transmitters 116 transmits radio signals via a transmitting antenna 120 to the portable portion 104 comprising first receivers 122, which operate on a first protocol, and second receivers 123, which operate on a second protocol. The radio signals comprise selective call addresses and message transactions between the transmitters 116 and the first and second receivers 122, 123. The controller 112 preferably is coupled by conventional telephone links 101 to a public switched telephone network (PSTN) 110 for receiving selective call messages therefrom. The selective call messages comprise voice and data messages received from the PSTN 110 using, for example, a conventional telephone 124 coupled to the PSTN 110 in a manner well known in the art.

Data and control transmissions between the transmitters 116 and the first and second receivers 122, 123 utilize the first and second protocols, which preferably are from the Motorola FLEX™ family of protocols, described more fully in U.S. Pat. No. 5,168,493 issued Dec. 1, 1992 to Nelson et al., which patent is hereby incorporated herein by reference. These protocols utilize well-known error detection and error correction techniques and are therefore tolerant to bit errors occurring during transmission, provided that the bit errors are not too numerous in any one code word. Preferably, the first and second protocols are capable of utilizing up to first and second maximum numbers of subchannels, respectively, in a given bandwidth. For example, the first protocol can communicate on up to 4 subchannels in a 50 kHz bandwidth, and the second protocol can communicate on up to 7 subchannels in the same bandwidth.

The transmitters 116 preferably transmit two and four-level FSK data messages to the first and second receivers 122, 123 during control and digital message portions, and transmit single-side-band messages during analog message portions. It will be appreciated that, alternatively, other error detecting and error correcting signaling protocols, modulation schemes, and transmission rates can be utilized as well.

Figure 2:
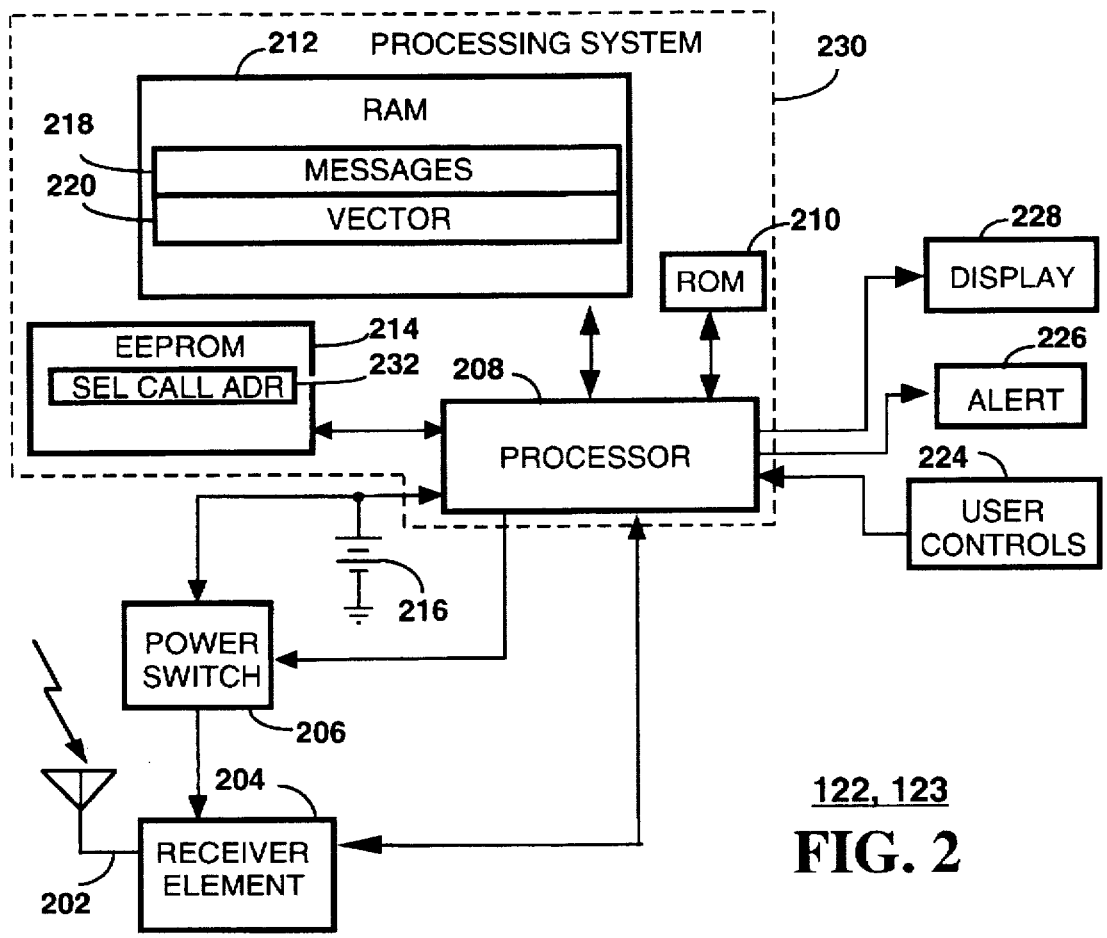
FIG. 2 is an electrical block diagram of a radio communication receiver in accordance with the preferred embodiment of the present invention.

FIG. 2 is an electrical block diagram of the first and second receivers 122, 123 in accordance with the preferred embodiment of the present invention. The first and second receivers 122, 123 comprise a receiver antenna 202 for intercepting RF signals from the transmitters 116. The receiver antenna 202 is coupled to a receiver element 204, which includes a receiver utilizing conventional demodulation techniques for receiving the communication signal from the transmitters 116. Radio signals received by the receiver element 204 produce demodulated information, which is coupled to a processing system 230 for processing messages received from the transmitters 116. A conventional power switch 206, coupled to the processing system 230, is used to control the supply of power to the receiver element 204, thereby providing a battery saving function.

To perform the necessary functions of the first and second receivers 122, 123, the processing system 230 comprises a processor 208 coupled to a random access memory (RAM) 212, a read-only memory (ROM) 210, and an electrically erasable programmable read-only memory (EEPROM) 214. Preferably, the processor 208 is similar to the M68HC08 micro-controller manufactured by Motorola, Inc. It will be appreciated that other similar processors can be utilized for the processor 208, and that additional processors of the same or alternative type, as well as a hardware decoder, can be added as required to handle the processing requirements of the processing system 230. It will be also appreciated that other types of memory, e.g., EEPROM or FLASH, can be utilized for the ROM 210, as well as the RAM 212. It will be further appreciated that the RAM 212 and the ROM 210, singly or in combination, can be incorporated as an integral portion of the processor 208.

The processing system 230 is programmed by way of the ROM 210 to process incoming messages received in either the first protocol or the second protocol. During message processing, the processor 208 decodes in a conventional manner an address in the demodulated data of the message, compares the decoded address with one or more selective call addresses 232 stored in the EEPROM 214, and when a match is detected, the processor 208 proceeds to decode a corresponding vector 220 received from the fixed portion for designating a subchannel and a time the radio communication system 102, 104 will utilize for transmitting a message to the receiver 122, 123. The vector 220 is stored in the RAM 212, and at the designated time the processing system 230 activates the receiver element 204 on the designated subchannel for receiving the message.

Once the processor 208 has processed the message, it stores the message in a location for messages 218 of the RAM 212, and a call alerting signal is generated to alert a user that a message has been received. The call alerting signal is directed to a conventional audible or tactile alerting device 226 for generating an audible or tactile call alerting signal.

The message can be accessed by the user through user controls 224, which provide functions such as lock, unlock, delete, read, etc. More specifically, by the use of appropriate functions provided by the user controls 224, the message is recovered from the RAM 212, and then displayed on a display 228, e.g., a conventional liquid crystal display (LCD).

Figure 3:
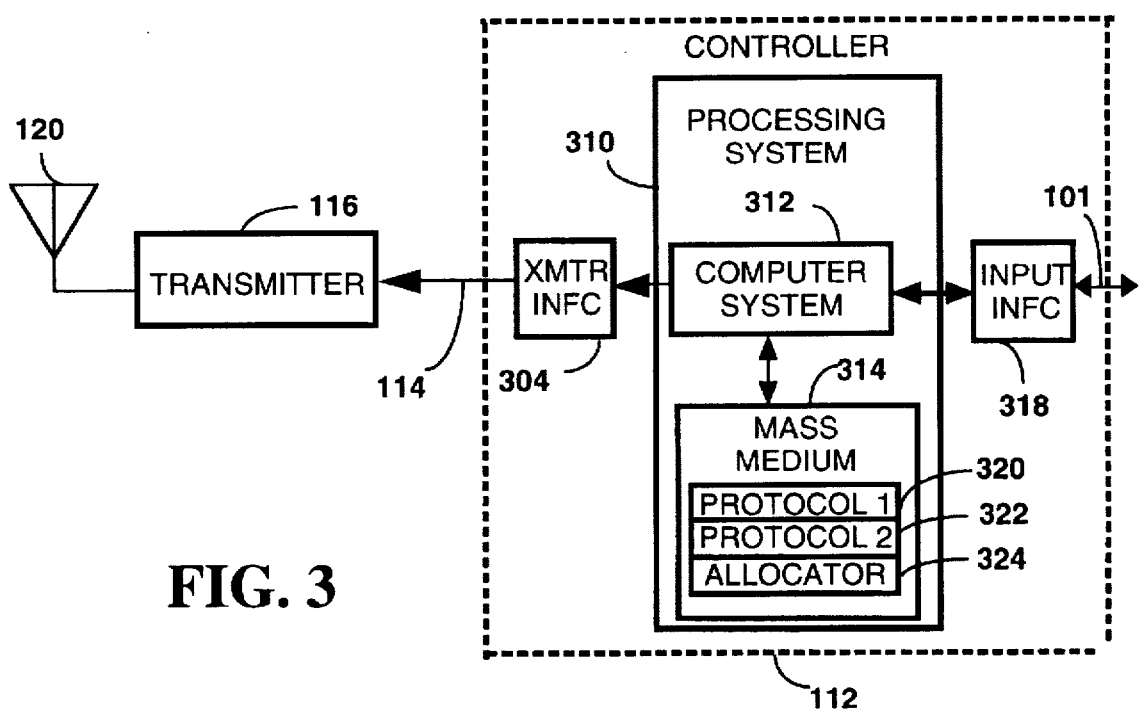
FIG. 3 is an electrical block diagram of a controller in accordance with the preferred embodiment of the present invention.

Referring to FIG. 3, an electrical block diagram of elements of the fixed portion 102 in accordance with the preferred embodiment of the present invention comprises portions of the controller 112 and the transmitters 116. The controller 112 comprises a processing system 310 for directing operation of the controller 112. The processing system 310 preferably is coupled through a transmitter interface 304 to the transmitter 116 via the communication links 114. The communication links 114 use conventional means well known in the art, such as a direct wire line (telephone) link, a data communication link, or any number of radio frequency links, such as a radio frequency (RF) transceiver link, a microwave transceiver link, or a satellite link, just to mention a few.

The processing system 310 is also coupled to an input interface 318 for communicating with the PSTN 110 through the telephone links 101 for receiving selective call originations from a message originator. In order to perform the functions (to be described below) necessary in controlling the elements of the controller 112, as well as the elements of the transmitters 116, the processing system 310 preferably includes a conventional computer system 312, and conventional mass medium 314. The mass medium 314 preferably comprises locations for storing the first and second protocols 320, 322 on which the radio communication system 102, 104 operates. In addition, the mass medium stores an allocator 324 for determining the sharing plan for the subchannels utilized by the first and second protocols and for vectoring the first and second receivers in accordance with the sharing plan.

The mass medium 314 also includes subscriber user information such as, for example, portable subscriber unit 122 addressing, programming options, etc. The conventional computer system 312 is programmed by way of software included in the conventional mass medium 314. The conventional computer system 312 preferably comprises a plurality of processors such as VME Sparc processors manufactured by Sun Microsystems, Inc. These processors include memory such as dynamic random access memory (DRAM), which serves as a temporary memory storage device for scratch pad processing such as, for example, storing messages originated by callers using the PSTN 110, processing acknowledgments received from the first and second receivers 122 123, and for protocol processing of messages destined for the first and second receivers 122 123, just to mention a few. The mass medium 314 is preferably a conventional hard disk mass storage device.

It will be appreciated that other types of conventional computer systems 312 can be utilized, and that additional computer systems 312 and mass medium 314 of the same or alternative type can be added as required to handle the processing requirements of the processing system 310.

In accordance with the present invention, the processing system 310 is programmed for synchronizing the transmission frames of the first protocol 320 with those of the second protocol 322. The processing system 310 is further programmed for determining a sharing plan for the subchannels utilized by the first and second protocols 320, 322 within the common bandwidth of the system. The sharing plan is applicable to a subsequent group, e.g., the next group after the current group, of simultaneous transmission frames. The processing system 310 is further programmed for vectoring a receiver that has a message to be received in one of the first and second protocols. The vectoring is done in accordance with the sharing plan and prior to a transmission of the subsequent group of simultaneous transmission frames. The vectoring is communicated to the receiver in a vectors portion of the first and second protocols, as described herein below.

Preferably, the processing system 310 designates a first control subchannel for receivers in the portable portion that operate on the first protocol and a second control subchannel for receivers in the portable portion that operate on the second protocol, and the vectoring occurs on the first control subchannel if the receiver operates on the first protocol, and occurs on the second control subchannel if the receiver operates on the second protocol. In addition, the first and second control subchannels preferably occupy first and second subchannels positioned on opposite edges of the common bandwidth. This allows maximum flexibility in using the remaining bandwidth between the control subchannels for either the first or the second protocol.

The processing system 310 is programmed for dynamically allocating the subchannels between the first and second protocols in response to a measurement of traffic using the first and second protocols. Preferably, the processing system 310 makes a comparison of the total length of messages in queue for the first receivers 122 with the total length of messages in queue for the second receivers 123. Then the processing system 310 determines the sharing plan based on the comparison. For example, if the first receivers 122 have three times the total length of messages in queue compared to the messages of the second receivers 123, then in a subsequent group of simultaneous frames the processing system 310 will assign approximately three times as many subchannels to the first protocol as to the second protocol.

Consistent with maximum utilization of the bandwidth assigned to the system, it is not always possible to assign subchannels in the exact same proportions as the proportions of messages in queue for the first and second receivers 122, 123. For example, if the first protocol supports a maximum of four subchannels, and the second protocol supports a maximum of seven subchannels, the possible mixes of subchannels carrying the first and second protocols, respectively, while maximizing the bandwidth utilized, are: 4/0, 3/1, 2/3, 1/5, and 0/7 subchannels. In this example, the processing system 310 preferably selects the one of the five combinations of subchannels that is closest to the proportions of messages in queue for the first and second receivers 122, 123, respectively. It will be appreciated that, alternatively, other similar methods can be utilized for determining the sharing plan. For example, it may be desirable to eliminate subchannel combinations such as 4/0 and 0/7 to prevent excessive latency in the least used protocol.

Figure 4:
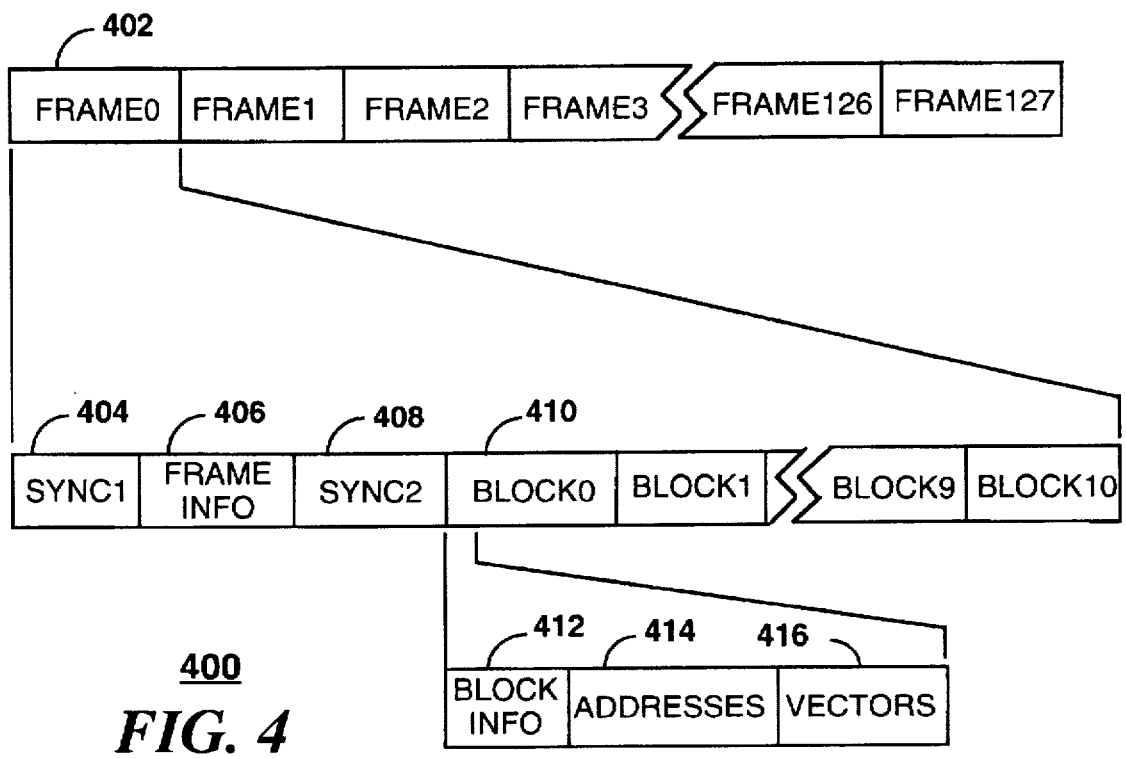
FIG. 4 is a timing diagram of a protocol in accordance with the preferred embodiment of the present invention.

FIG. 4 is a timing diagram 400 of a portion of the first and second protocols utilized by the radio communication system in accordance with the preferred embodiment of the present invention. The first and second protocols each comprise a plurality of frames 402 (one hundred and twenty eight shown by way of example). Each frame 402 includes a sync1 field 404, a frame information code word 406, a sync2 field 408, and a plurality of blocks 410 (eleven blocks shown by way of example). The first part of the first block 410 carries block information 412 of a general nature about the block. In addition, the first part of each control frame 402 carries addresses 414 of receivers having messages to be transmitted and received, and corresponding vectors 416 specifying the subchannels and times at which the messages will be transmitted.

Figure 5:
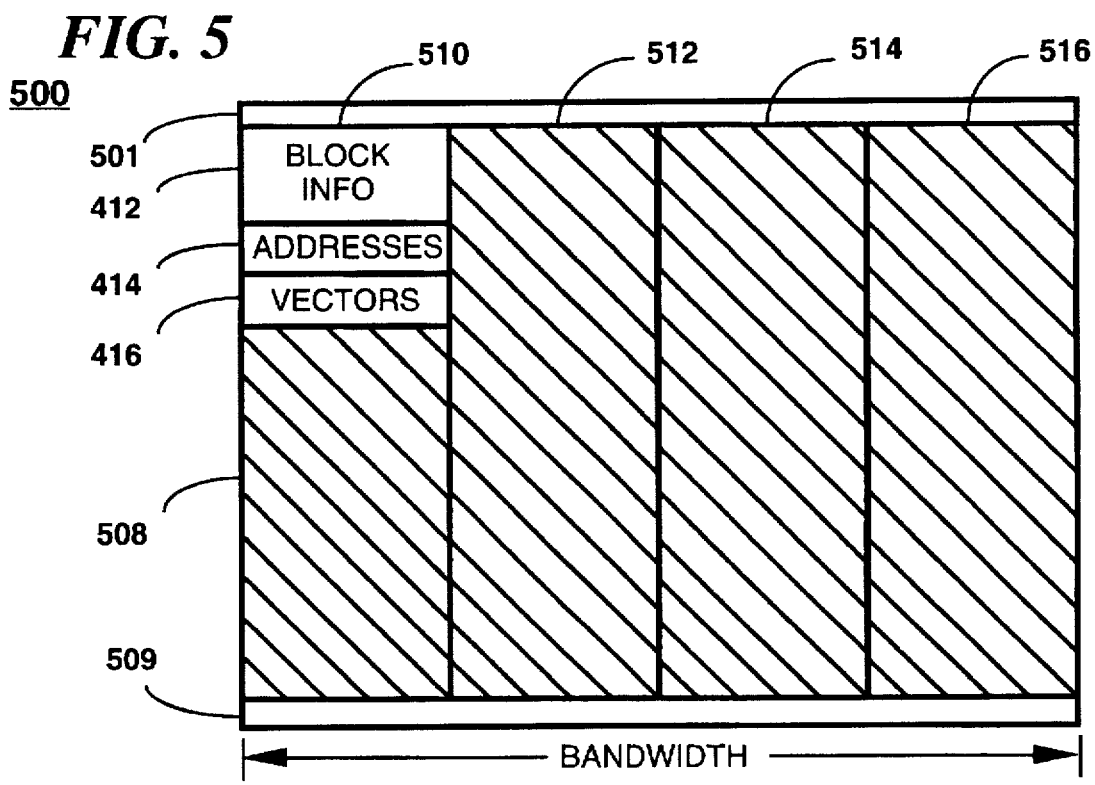
FIG. 5 is a bandwidth occupancy diagram corresponding to a four-subchannel protocol.

FIG. 5 is a bandwidth occupancy diagram 500 corresponding to a first protocol that can operate on up to four subchannels in a fifty kHz bandwidth. This protocol is referred to hereafter as the four-subchannel protocol. The bandwidth occupied is depicted by a control subchannel 510 at the lower edge of the bandwidth and three information subchannels 512–516. In each of the subchannels a transmission frame begins with a synchronization portion 501, comprising the sync1 field 404, the frame information code word 406, and the sync2 field 408. This is followed by the plurality of blocks 410. On the control subchannel 510 the first block 410 carries the block information 412, followed by the addresses 414 of the receivers having messages to be transmitted, followed by the corresponding vectors 416. The vectors 416 each designate a subchannel and a time at which a message will be transmitted to the receiver(s) that match the corresponding address. The messages are then transmitted in the shaded portions 508 of the control subchannel 510 and in the three information subchannels 512–516. The messages also can overlap into a subsequent group of transmission frames. The current transmission frames end at the bottom of the shaded portions 508, where a next synchronization portion 509 begins a next subsequent group of transmission frames.

Figure 6:
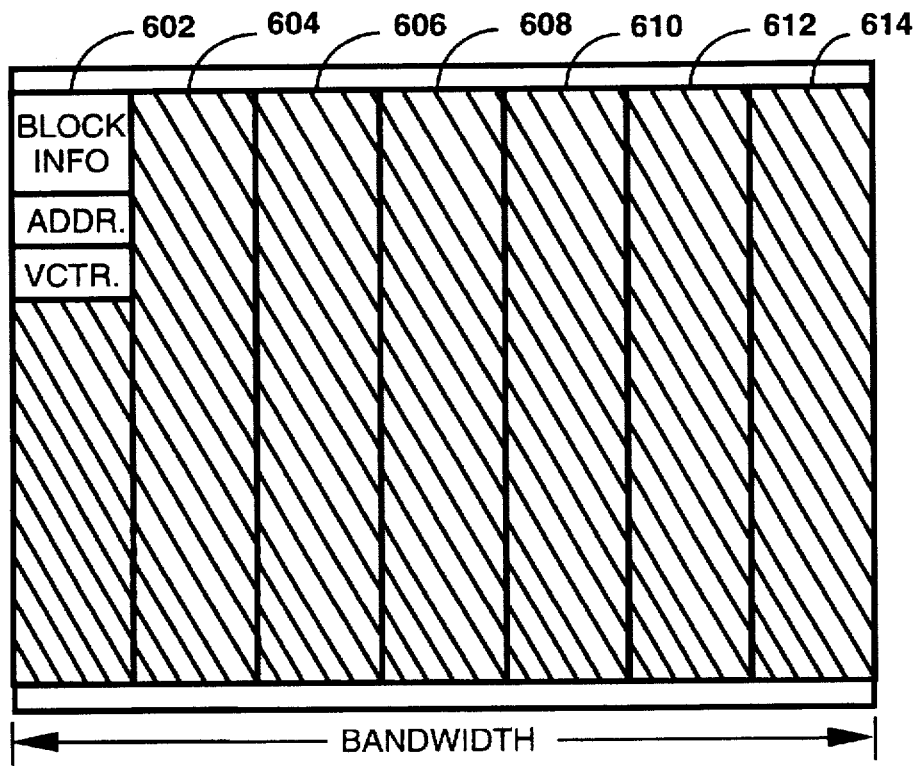
FIG. 6 is a bandwidth occupancy diagram corresponding to a seven-subchannel protocol.

FIG. 6 is a bandwidth occupancy diagram 600 corresponding to a second protocol that can operate on up to seven subchannels in a fifty kHz bandwidth. This protocol is referred to hereafter as the seven-subchannel protocol. The diagram 600 is similar to the diagram 500, the essential difference being that there are seven subchannels 602–614 instead of four.

Figure 7:
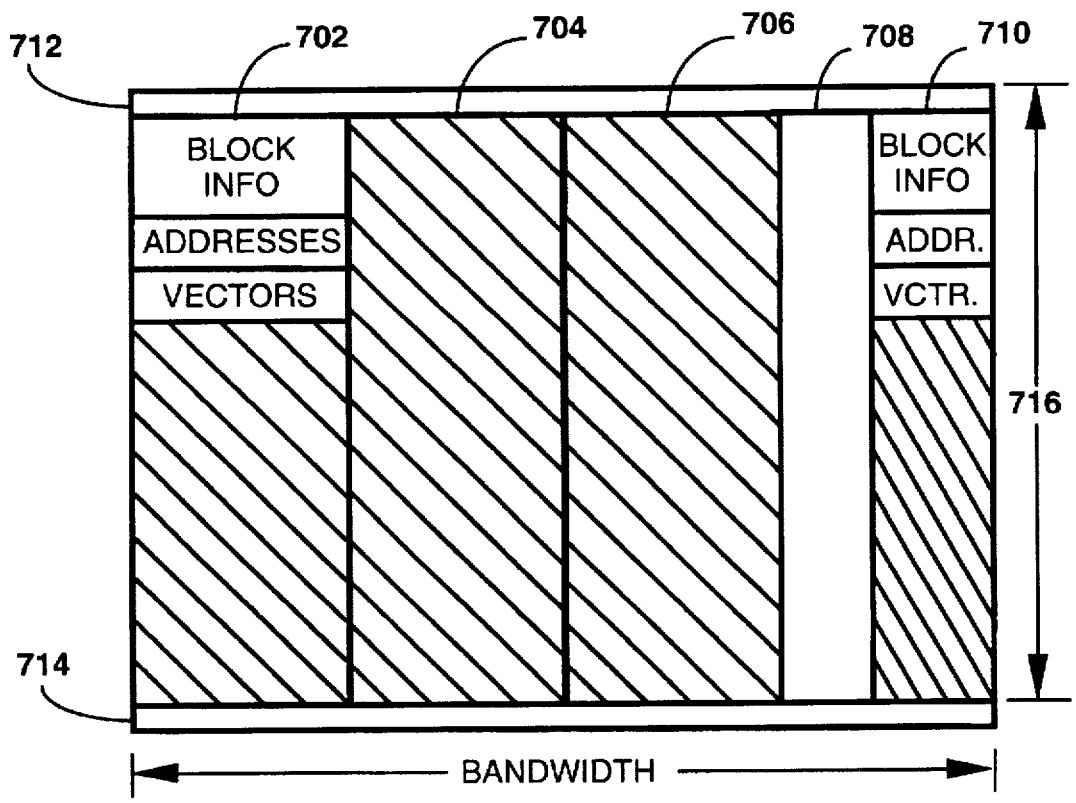
FIGS. 7-9 are bandwidth occupancy diagrams corresponding to the four-subchannel protocol mixed with the seven-subchannel protocol in accordance with the preferred embodiment of the present invention.

FIG. 7 is a bandwidth occupancy diagram 700 corresponding to the four-subchannel protocol mixed with the seven-subchannel protocol in accordance with the preferred embodiment of the present invention. The diagram 700 is similar to the diagrams 500, 600, the essential differences being that in the diagram 700 both the four-subchannel protocol and the seven-subchannel protocol share a common bandwidth on a frequency-multiplexed basis, and the control subchannel for the second protocol has been moved to the subchannel 710 at the upper edge of the bandwidth.

Note that the transmission frames of the two protocols are synchronized with one another, i.e., the synchronization portions 712, 714 of the subchannels 702–710 of both protocols are aligned with one another. For synchronization to be maintained, the first and second frame durations 716, i.e., the time between the start of the synchronization portions 712, 714, of the first and second protocols, preferably are integer multiples of one another. In the example depicted in the diagram 700 the first and second frame durations are identically the same, i.e., the integer multiple is one. It will be appreciated that, alternatively, the first frame duration can be two, three, four, etc., times the second frame duration, and synchronization still can be maintained between the two protocols. For protocols in which the first and second frame durations are not identically the same, the sharing plan for the subchannels can be changed only at the boundaries between the frames of the protocol having the longer frame duration.

The diagram 700 depicts three subchannels 702, 704, 706 utilized by the four-subchannel protocol, and one subchannel 710 utilized by the seven-subchannel protocol. In addition, a remainder 708 of the bandwidth is not utilized by either protocol, as it is too narrow to accommodate a subchannel of either protocol. The diagram 700 is representative of a system on which there is relatively little traffic utilizing the seven-subchannel protocol, compared to that utilizing the four-subchannel protocol. If the traffic utilizing the seven-subchannel protocol increases, the sharing plan can be changed in a next subsequent group of transmission frames following the current group.

Figure 8:
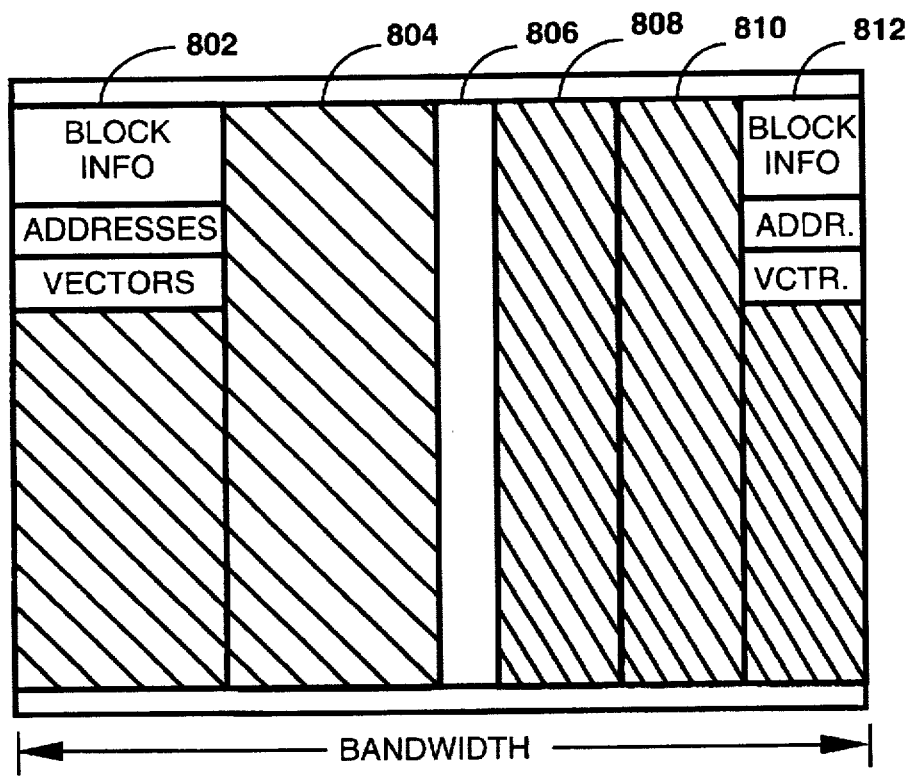

FIG. 8 is a bandwidth occupancy diagram 800 corresponding to the four-subchannel protocol mixed with the seven-subchannel protocol in accordance with the preferred embodiment of the present invention. The diagram 800 is similar to the diagram 700, the essential difference being that the diagram 800 depicts two subchannels 802, 804 utilized by the four-subchannel protocol, and three subchannels 808, 810, 812 utilized by the seven-subchannel protocol. In addition, a remainder 806 of the bandwidth is not utilized by either protocol. The diagram 800 is representative of a system on which there is substantially equal traffic utilizing each of the two protocols.

Figure 9:
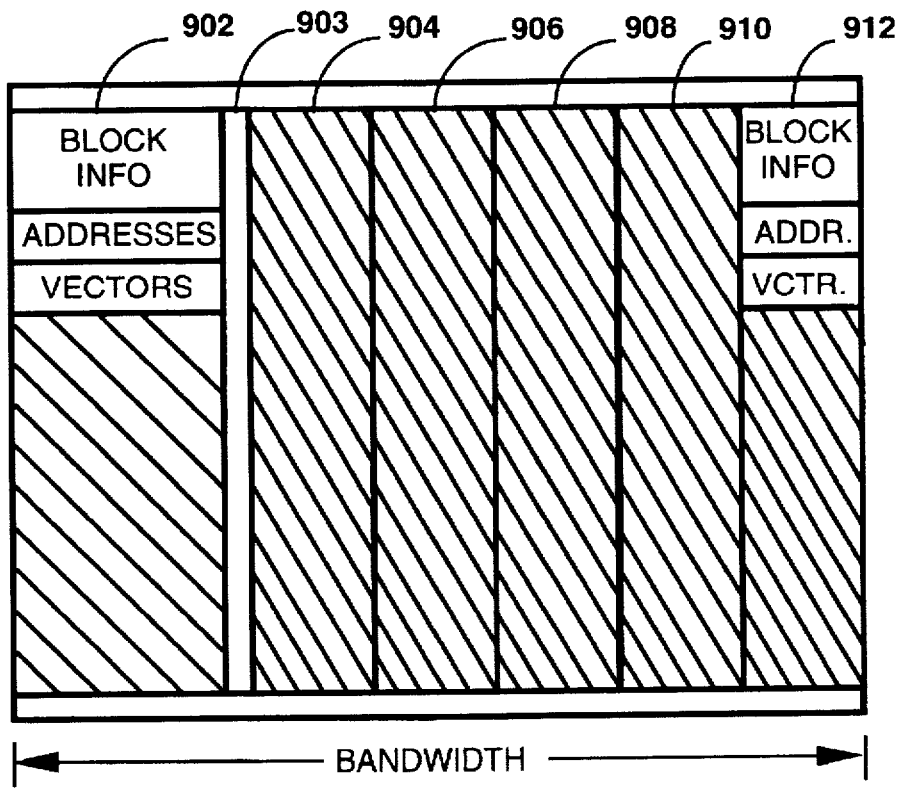

FIG. 9 is a bandwidth occupancy diagram 900 corresponding to the four-subchannel protocol mixed with the seven-subchannel protocol in accordance with the preferred embodiment of the present invention. The diagram 900 is similar to the diagram 800, the essential difference being that the diagram 900 depicts one subchannel 902 utilized by the four-subchannel protocol, and five subchannels 904–912 utilized by the seven-subchannel protocol. In addition, a remainder 903 of the bandwidth is not utilized by either protocol. The diagram 900 is representative of a system on which there is relatively little traffic utilizing the four-subchannel protocol, compared to that utilizing the seven-subchannel protocol.

The frequency-multiplexed protocol sharing technique depicted in the diagrams 700, 800, and 900 advantageously minimizes latency compared to prior art techniques, which have utilized time-division multiplexing for sharing two protocols on a common bandwidth. This is so, because prior art time-division multiplexing systems have alternated between the different protocols, thereby delaying messages of one protocol while another protocol is transmitting. The frequency-multiplexed protocol sharing technique in accordance with the present invention advantageously allows simultaneous communication of messages in both protocols, thereby minimizing protocol-sharing-induced delays.

Figure 10:
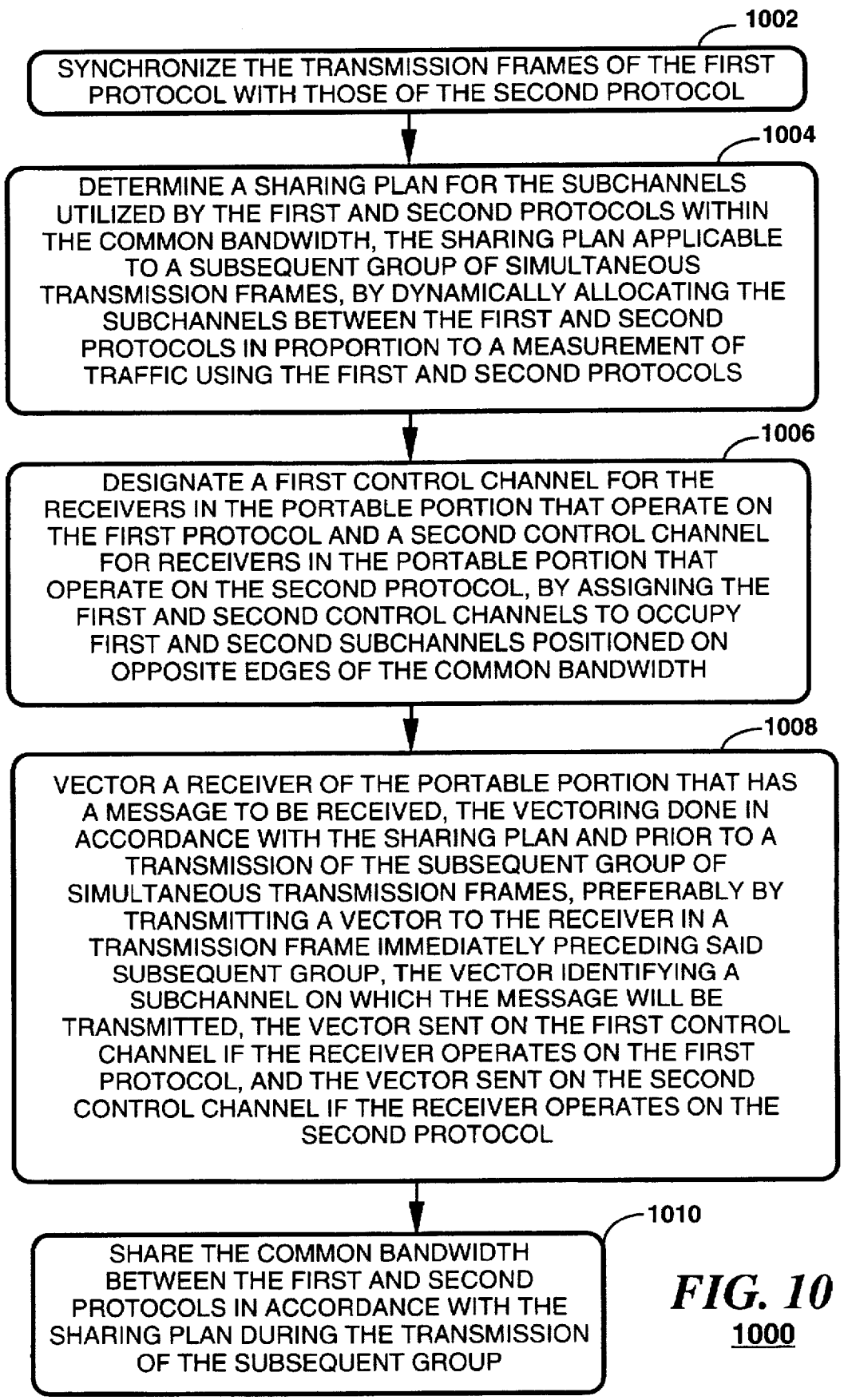
FIG. 10 is a flow chart depicting operation of the radio communication system in accordance with the preferred embodiment of the present invention.

FIG. 10 is a flow chart depicting operation of the radio communication system in accordance with the preferred embodiment of the present invention. In step 1002, the controller 112 synchronizes the transmission frames of the first and second protocols utilizing control techniques well known in the art. Then, in step 1004, the controller 112 determines a sharing plan for the subchannels utilized by the four-subchannel protocol and the seven-subchannel protocol within the common bandwidth. The sharing plan is applicable to a subsequent group of simultaneous transmission frames, e.g., the group of frames to be transmitted immediately after the currently transmitted group of transmission frames are completed. The subchannels of the common bandwidth preferably are allocated between the two protocols in response to measured traffic, as described herein above. In step 1006, the controller 112 assigns a subchannel at the lower edge of the common bandwidth as a control subchannel for one of the protocols, and a subchannel at the upper edge of the common bandwidth as a control subchannel for the other of the protocols.

In step 1008, the controller 112 generates a vector for identifying a subchannel to be used for each receiver that has a message to be received. The vector is generated in accordance with the sharing plan, so that, for example, a first receiver 122 that operates on the four-subchannel protocol is vectored to one of the subchannels designated for use by the four-subchannel protocol, while a second receiver 123 that operates on the seven-subchannel protocol is vectored to one of the subchannels designated for use by the seven-subchannel protocol. The vector is communicated to the appropriate receiver 122, 123 on the control subchannel appropriate for the protocol of the receiver in the vectors 416 of the protocol, preferably in a transmission frame preceding the transmission frame to be used for transmitting the corresponding message. In step 1010, the result in accordance with the present invention is that the common bandwidth is shared between the two protocols according to the sharing plan during the transmission and reception of the subsequent group of transmission frames.

Figure 11:
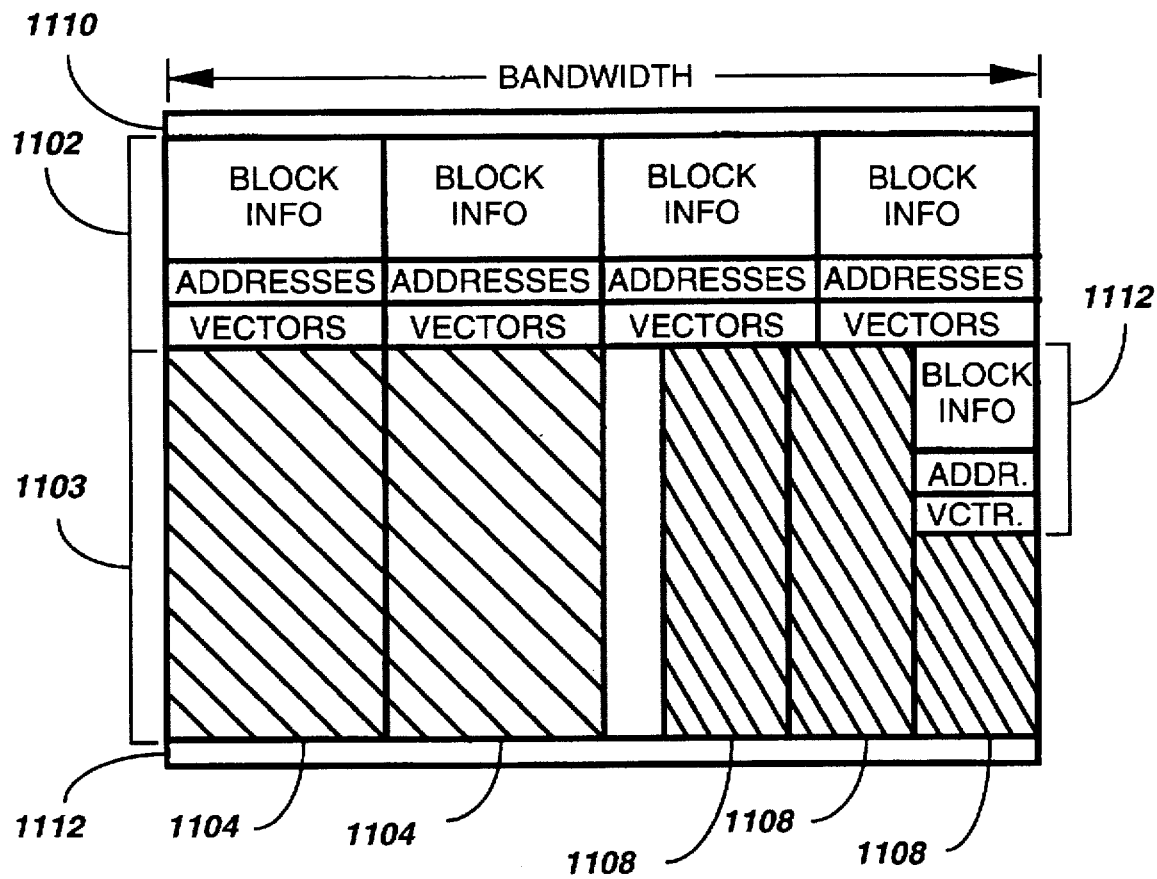
FIG. 11 is a bandwidth occupancy diagram corresponding to the four-subchannel protocol mixed with the seven-subchannel protocol in accordance with an alternative embodiment of the present invention.

FIG. 11 is a bandwidth occupancy diagram 1100 corresponding to the four-subchannel protocol mixed with the seven-subchannel protocol in accordance with an alternative embodiment of the present invention. The diagram 1100 depicts four control subchannels 1102 selected from the four subchannels of the four-subchannel protocol. The control subchannels 1102 comprise block information, addresses, and vectors for steering the receivers 122 operating on the four-subchannel protocol to an appropriate subchannel for receiving a message transmission. The message transmissions 1103, preferably comprising messages transmitted on subchannels 1104 assigned to the four-subchannel protocol and on subchannels 1108 assigned to the seven-subchannel protocol, follow the control subchannels 1102 on a time-division multiplex (TDM) basis. Preferably, a control subchannel 1112 for the seven-subchannel protocol is transmitted as shown, following the control subchannels 1102 for the four-subchannel protocol, and concurrent with the message transmissions 1103. It will be appreciated that, depending on system traffic requirements, less than all four (e.g., one) of the subchannels of the four-subchannel protocol can be utilized for transmitting the control information. It will also be appreciated that, alternatively, the control subchannel 1112 for the seven-subchannel protocol can be transmitted on additional ones of the subchannels 1108, or can be assigned a TDM slot of its own as was done with the control subchannels 1102 of the four-subchannel protocol.

Thus, it should be apparent by now that the present invention provides a method and apparatus for sharing a common bandwidth between two protocols used in a radio communication system. The present invention advantageously minimizes latency by utilizing a frequency-multiplexed technique for sharing the bandwidth. The present invention also provides for flexible and efficient sharing of the common bandwidth between the two protocols through a traffic-based dynamic assignment of subchannels between the protocols.

While the foregoing description represents a preferred embodiment in accordance with the present invention, it will be obvious to one of ordinary skill in the art that various changes and modifications can be made. For example, the disclosed bandwidth sharing technique is applicable to the more general case of sharing a common bandwidth between first and second protocols that can support up to N subchannels and M subchannels, respectively, within the common bandwidth, N and M being predetermined positive integer values. Accordingly, the scope of the invention is delimited only in accordance with the following claims.

What is claimed is:

1. In a radio communication system including a fixed portion and a portable portion, a method for sharing a common bandwidth between first and second protocols that can support up to N subchannels and M subchannels, respectively, within the common bandwidth, N and M being predetermined positive integer values, wherein the first and second protocols utilize transmission frames having first and second frame durations that are integer multiples of one another, the method comprising in the fixed portion the steps of:
    synchronizing the transmission frames of the first protocol with those of the second protocol;
    determining a sharing plan for the subchannels utilized by the first and second protocols within the common bandwidth, the sharing plan applicable to a subsequent group of simultaneous transmission frames comprising messages; and
    vectoring a receiver of the portable portion that has a message to be received in one of the first and second protocols, the vectoring done in accordance with the sharing plan and prior to a transmission of said subsequent group of simultaneous transmission frames; and in both the fixed portion and the portable portion the step of
    sharing the common bandwidth between the first and second protocols in accordance with the sharing plan during the transmission of said subsequent group of simultaneous transmission frames.

2. The method of claim 1, wherein the determining step comprises the step of
    dynamically allocating the subchannels between the first and second protocols in response to a measurement of traffic operating on the first and second protocols.

3. The method of claim 1, wherein the vectoring step comprises the step of
    transmitting a vector to the receiver in a transmission frame immediately preceding said subsequent group, the vector identifying a subchannel on which the message will be transmitted.

4. The method of claim 1, further comprising in the fixed portion the step of
    designating a first control subchannel for receivers in the portable portion that operate on the first protocol and a second control subchannel for receivers in the portable portion that operate on the second protocol, and wherein the vectoring step occurs on the first control subchannel if the receiver operates on the first protocol, and occurs on the second control subchannel if the receiver operates on the second protocol.

5. The method of claim 4, wherein the designating step comprises the step of assigning the first and second control subchannels to occupy first and second subchannels positioned on opposite edges of the common bandwidth.

6. The method of claim 1, further comprising in the fixed portion the step of designating at least one control subchannel selected exclusively from either the N subchannels or the M subchannels, and wherein the vectoring step for the corresponding one of the first and second protocols comprises the step of transmitting control information on the at least one control subchannel.

7. The method of claim 6, further comprising in the fixed portion the step of transmitting the messages, wherein the steps of transmitting the control information and transmitting the messages are performed sequentially on a time-division-multiplex basis.

8. A radio communication system for sharing a common bandwidth between first and second protocols that can support up to N subchannels and M subchannels, respectively, within the common bandwidth, N and M being predetermined positive integer values, wherein the first and second protocols utilize transmission frames having first and second frame durations that are integer multiples of one another, the radio communication system comprising:

a fixed portion, comprising:
  a controller, comprising:
    a processing system for controlling the radio communication system;
    an input interface coupled to the processing system for receiving messages intended for a portable portion; and
    a transmitter interface coupled to the processing system for controlling a plurality of transmitters to send the messages to the portable portion,
    wherein the processing system is programmed for synchronizing the transmission frames of the first protocol with those of the second protocol, and
    wherein the processing system is further programmed for determining a sharing plan for the subchannels utilized by the first and second protocols within the common bandwidth, the sharing plan applicable to a subsequent group of simultaneous transmission frames, and
    wherein the processing system is further programmed for vectoring a receiver of the portable portion that has a message to be received in one of the first and second protocols, the vectoring done in accordance with the sharing plan and prior to a transmission of said subsequent group of simultaneous transmission frames, and
  wherein the fixed portion further comprises
    a plurality of transmitters coupled to the transmitter interface for sending an address, a vector, and the message to the receiver, and
wherein the radio communication system further comprises:
  the portable portion, comprising:
    first receivers coupled to the fixed portion by a radio signal operating on the first protocol; and
    second receivers coupled to the fixed portion by a radio signal operating on the second protocol, and wherein the fixed portion and the portable portion share the common bandwidth between the first and second protocols in accordance with the sharing plan during the transmission of said subsequent group of simultaneous transmission frames.

9. The radio communication system of claim 8, wherein the processing system is further programmed for dynamically allocating the subchannels between the first and second protocols in response to a measurement of traffic using the first and second protocols.

10. The radio communication system of claim 8, wherein the processing system is further programmed for transmitting a vector to the receiver in a transmission frame immediately preceding said subsequent group, the vector identifying a subchannel on which the message will be transmitted.

11. The radio communication system of claim 10, wherein the processing system is further programmed for:

designating a first control subchannel for the first receivers in the portable portion that operate on the first protocol and a second control subchannel for the second receivers in the portable portion that operate on the second protocol; and transmitting a vector on the first control subchannel for a receiver that operates on the first protocol, and transmitting the vector on the second control subchannel for a receiver that operates on the second protocol.

12. The radio communication system of claim 11, wherein the processing system is further programmed to assign the first and second control subchannels to occupy first and second subchannels positioned on opposite edges of the common bandwidth.

13. The radio communication system of claim 8, wherein the processing system is further programmed for:

designating at least one control subchannel selected exclusively from either the N subchannels or the M subchannels; and performing the vectoring for the corresponding one of the first and second protocols, comprising transmitting control information on the at least one control subchannel.

14. The radio communication system of claim 13, wherein the processing system is further programmed for transmitting the control information and transmitting the messages on a time-division-multiplex basis.

15. A controller in a radio communication system for sharing a common bandwidth between first and second protocols that can support up to N subchannels and M subchannels, respectively, within the common bandwidth, N and M being predetermined positive integer values, wherein the first and second protocols utilize transmission frames having first and second frame durations that are integer multiples of one another, the controller comprising:

a processing system for controlling the radio communication system;

an input interface coupled to the processing system for receiving messages intended for a portable portion; and a transmitter interface coupled to the processing system for controlling a plurality of transmitters to send the messages to the portable portion, wherein the processing system is programmed for synchronizing the transmission frames of the first protocol with those of the second protocol, and wherein the processing system is further programmed for determining a sharing plan for the subchannels utilized by the first and second protocols within the common bandwidth, the sharing plan applicable to a subsequent group of simultaneous transmission frames, and wherein the processing system is further programmed for vectoring a receiver of the portable portion that has a message to be received in one of the first and second protocols, the vectoring done in accordance with the sharing plan and prior to a transmission of said subsequent group of simultaneous transmission frames, and wherein the controller controls the radio communication system to share the common bandwidth between the first and second protocols in accordance with the sharing plan during the transmission of said subsequent group of simultaneous transmission frames.

16. The controller of the radio communication system of claim 15, wherein the processing system is further programmed for dynamically allocating the subchannels between the first and second protocols in response to a measurement of traffic using the first and second protocols.

17. The controller of claim 15, wherein the processing system is further programmed for transmitting a vector to a receiver in a transmission frame immediately preceding said subsequent group, the vector identifying a subchannel on which the message will be transmitted.

18. The controller of claim 15, wherein the processing system is further programmed for:

designating a first control subchannel for first receivers in the portable portion that operate on the first protocol and a second control subchannel for second receivers in the portable portion that operate on the second protocol; and transmitting a vector on the first control subchannel for a receiver that operates on the first protocol, and transmitting the vector on the second control subchannel for a receiver that operates on the second protocol.

19. The controller of claim 18, wherein the processing system is further programmed to assign the first and second control subchannels to occupy first and second subchannels positioned on opposite edges of the common bandwidth.

20. The controller of claim 19, wherein the processing system is further programmed for:

designating at least one control subchannel selected exclusively from either the N subchannels or the M subchannels; and performing the vectoring for the corresponding one of the first and second protocols, comprising transmitting control information on the at least one control subchannel.

21. The controller of claim 20, wherein the processing system is further programmed for transmitting the control information and transmitting the messages on a time-division-multiplex basis.

* * * * *